United States Patent [19]

Jones

[11] 4,060,011
[45] Nov. 29, 1977

[54] ENGINE MOUNTINGS

[75] Inventor: Clive Jones, Coventry, England

[73] Assignee: Chrysler United Kingdom Limited, London, England

[21] Appl. No.: 640,863

[22] Filed: Dec. 15, 1975

[30] Foreign Application Priority Data

Dec. 24, 1974 United Kingdom ............... 55693/74

[51] Int. Cl.² .............................................. B62D 1/20
[52] U.S. Cl. ..................................... 74/498; 180/64 R
[58] Field of Search ......................... 74/498, 422, 606; 180/64 R, 42 R, 43 R, 64

[56] References Cited

U.S. PATENT DOCUMENTS

| 3,110,270 | 11/1963 | Ingram | 74/422 |
| 3,205,642 | 9/1965 | Smith | 180/64 R |
| 3,554,048 | 1/1971 | Adams | 74/498 |
| 3,593,593 | 7/1971 | Bradshaw | 74/498 |
| 3,679,196 | 7/1972 | Royer | 180/64 R |
| 3,864,989 | 2/1975 | Jones | 74/498 |
| 3,908,479 | 9/1975 | McDuff | 74/498 |

Primary Examiner—Samuel Scott
Assistant Examiner—Wesley S. Ratliff, Jr.
Attorney, Agent, or Firm—Edward F. Connors

[57] ABSTRACT

The disclosure relates to a rack and pinion steering mechanism for a motor vehicle in which the rack housing is stiffened by integral webs and has lugs to provide mountings for the vehicle engine.

3 Claims, 1 Drawing Figure

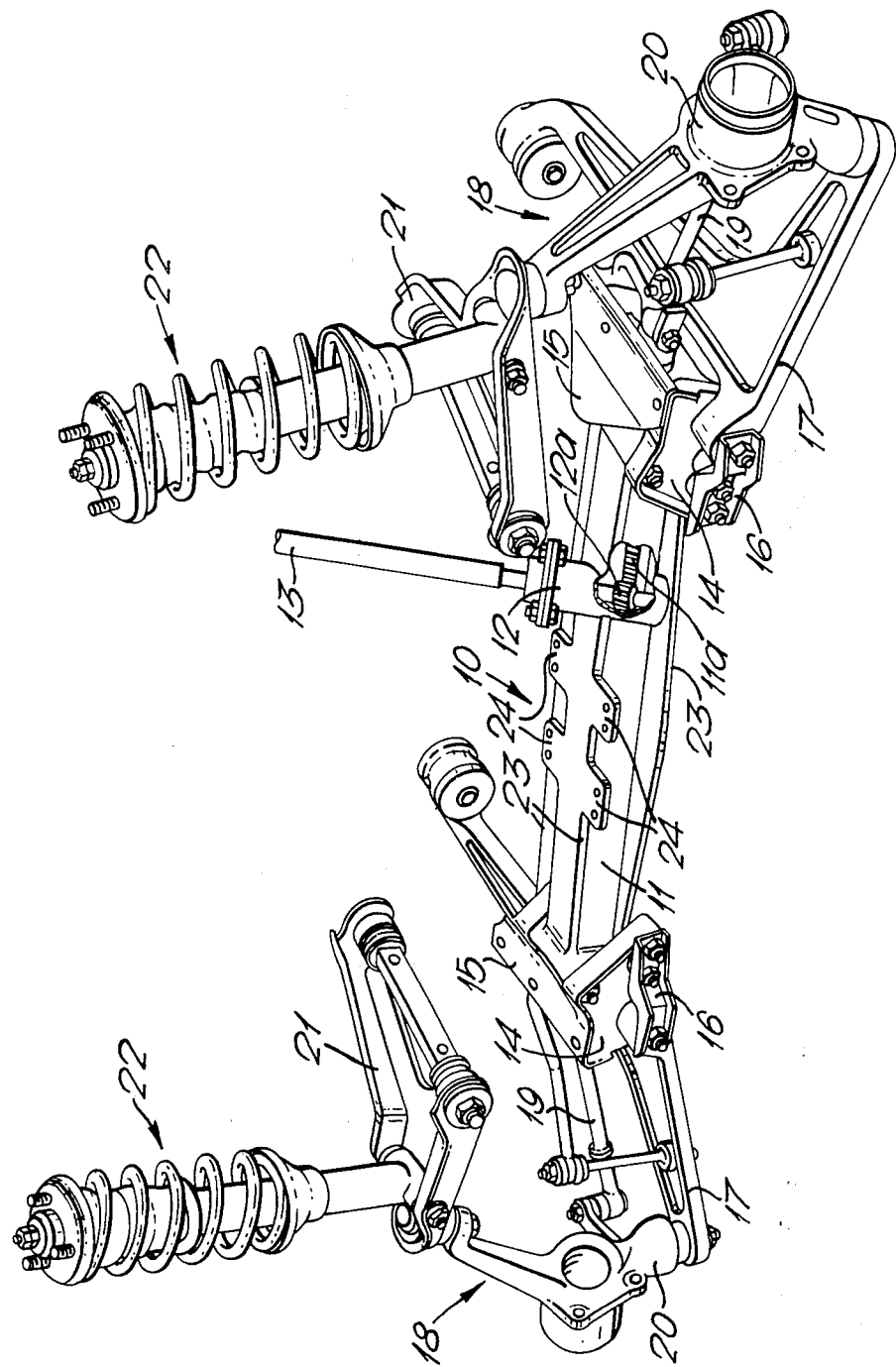

ENGINE MOUNTINGS

BACKGROUND OF THE INVENTION

1. Field of the Invention

This invention relates to engine mountings for motor vehicles.

2. Description of the Prior Art

It is conventional to mount a motor vehicle engine on mountings attached direct to the vehicle body structure or to a separate frame or cross-member attached to the body structure and on which components of the vehicle suspension and steering mechanism may also be mounted. It has also been proposed in U.S. Pat. No. 3,864,989 to mount elements of the vehicle suspension system on the housing of a rack and pinion steering mechanism mounted, in turn, directly on the vehicle body structure. In the latter arrangement the engine is separately mounted on the body structure. In all these arrangements, the separate mounting of the engine and steering mechanism requires a number of separate load supporting components the mountings for which may be difficult to accommodate in the body structure, and which may require separate reinforced areas on the body structure to withstand the load imposed thereon.

It is an object therefore of this invention to provide a simplified arrangement for the mounting of a steering system and engine mounting on a vehicle body structure.

SUMMARY OF THE INVENTION

The invention provides a steering assembly for a motor vehicle including a rack and pinion steering mechanism having a rigid elongate housing and a rack mounted for sliding movement in the housing, means on the housing for mounting the vehicle engine thereon and means to stiffen the housing against bending so that the housing can support at least a part of the weight of the engine.

BRIEF DESCRIPTION OF THE DRAWINGS

The drawing illustrates a front suspension, steering mechanism and engine mounting arrangement for a motor vehicle.

DESCRIPTION OF THE PREFERRED EMBODIMENTS

The front suspension assembly illustrated in the drawing includes a rack and pinion mechanism indicated generally at 10 which comprise a rigid hollow elongate rack housing 11 in which the rack 11a is slidably mounted. Towards one end of the rack housing 11 there is a steering box 12 containing a pinion 12a which meshes with the rack and a steering shaft is indicated at 13.

Brackets 14 are secured to each end of the rack housing 11, to which bracket plates 15 are secured. The plates 15 provide mountings for securing the rack housing 11 on to a vehicle body. The brackets 14 also support channel section members 16, which support in part lower wishbones 17 of double wishbone assemblies indicated generally at 18.

The ends of the rack protrude from the rack housing 11 and are connected by link arms 19 to swivel hubs 20 supported by the double wishbone assemblies. The upper wishbones 21 support the lower ends of the suspension telescopic struts and coil spring assemblies indicated generally at 22.

Alternatively a resilient mounting of the engine may be secured by bosses mounted on the rack housing 11 or it may be detachably secured to the rack housing 11.

Horizontally stiffening webs 23 formed integrally with the housing extend lengthwise of the rack housing 11 on the upper and lower sides thereof to stiffen the rack housing 11 against blending, so that the housing 11 can support at least a part of the weight of the engine.

The lower web increases in width to a maximum mid-way along the housing and tapers towards the ends of the housing.

Two pairs of mounting pads 24 are formed at spaced locations along the upper stiffening web of the housing, the pads projecting laterally of the webs. The webs receive resilient mounting on the underside of an engine to support at least a part of the engine on the housing.

The engine may be located transversely or longitudinally in the vehicle.

I claim:

1. A steering system and engine mounting assembly for a motor vehicle having an engine comprising:
    a. a rack and pinion steering mechanism having a rigid housing with opposing ends and a rack mounted for sliding movement in the housing and having opposing ends;
    b. wheel guidance means carried by the ends of the housing and attached to the rack;
    c. rack actuating means mounted in the housing and including a pinion engageable with the rack;
    d. said housing having an upper side on which the engine is partly supported and having a lower side;
    e. webs formed integral with and extending the length of the housing at the upper and lower sides thereof so as to stiffen the housing against bending so that the housing can support the weight of the engine; and
    f. means on the housing for mounting the engine thereon and including integral mounting pads formed on the web on the upper side and projecting laterally therefrom.

2. The invention of claim 1 wherein the web on the lower side increases in width to a maximum mid-way along the housing.

3. The invention of claim 1 wherein the housing has end mountings which both mount the housing on a vehicle body and support the pivoted wheel guidance arms of the vehicle suspension.

* * * * *